(12) United States Patent
Jo et al.

(10) Patent No.: US 8,663,793 B2
(45) Date of Patent: Mar. 4, 2014

(54) EXCELLENT HEAT-DISSIPATING BLACK RESIN COMPOSITION, METHOD FOR TREATING A ZINC COATED STEEL SHEET USING THE SAME AND STEEL SHEET TREATED THEREBY

(75) Inventors: Du Hwan Jo, Gwangyang (KR); Jae Ryung Lee, Gwangyang (KR); Sang Geol No, Gwangyang (KR); Jin Tae Kim, Gwangyang (KR); Hee Gwan Lee, Gwangyang (KR)

(73) Assignee: POSCO (KR)

( * ) Notice: Subject to any disclaimer, the term of this patent is extended or adjusted under 35 U.S.C. 154(b) by 443 days.

(21) Appl. No.: 12/521,001

(22) PCT Filed: Dec. 26, 2007

(86) PCT No.: PCT/KR2007/006821
§ 371 (c)(1),
(2), (4) Date: Jun. 24, 2009

(87) PCT Pub. No.: WO2008/078956
PCT Pub. Date: Jul. 3, 2008

(65) Prior Publication Data
US 2010/0021726 A1   Jan. 28, 2010

(30) Foreign Application Priority Data

Dec. 27, 2006 (KR) .......................... 10-2006-0135678
Aug. 24, 2007 (KR) .......................... 10-2007-0085451

(51) Int. Cl.
*B32B 5/16*   (2006.01)

(52) U.S. Cl.
USPC ........................................................ 428/323

(58) Field of Classification Search
USPC .......................................................... 428/323
See application file for complete search history.

(56) References Cited

U.S. PATENT DOCUMENTS 4,374,965 A   2/1983   Dickie et al.
5,298,059 A * 3/1994   Takimoto et al. .......... 106/14.17
(Continued)

FOREIGN PATENT DOCUMENTS

CN   1340087 A    3/2002
EP   1452563 A1   9/2004
(Continued)

OTHER PUBLICATIONS

Lambourne, Paint and Surface Coatings Theory and Practice, 1987, Ellis Horwood Limited, pp. 150-152.*

*Primary Examiner* — Elizabeth A Robinson
(74) *Attorney, Agent, or Firm* — The Webb Law Firm

(57) ABSTRACT

A heat-dissipating black resin composition having excellent physical properties such as heat-dissipation, workability, corrosion resistance, solvent resistance, coating adherence and gloss, and being free from chromium and used for surface treatment of a zinc coated steel sheet and a zinc coated steel sheet treated thereby. The composition includes, based on 100 parts by weight: 10 to 60 parts by weight of a resin composition which at least one main resin and a melamine-based curing agent are mixed in a weight ratio of 10:2-7, the main resin being selected from the group consisting of polyester, epoxy, polyolefin, polyurethane, fluorine, phenol, acryl and polycarbonate resins; 1 to 10 parts by weight of at least one pigment selected from the group consisting of carbon black and carbon nano tube; 1 to 10 parts by weight of a matting agent; and a solvent.

16 Claims, 4 Drawing Sheets

(56) References Cited

U.S. PATENT DOCUMENTS

| | | | |
|---|---|---|---|
| 5,780,530 A * | 7/1998 | Mizutani et al. | 523/209 |
| 6,518,331 B2 | 2/2003 | Sekimoto et al. | |
| 7,534,826 B2 | 5/2009 | Kim et al. | |
| 2002/0011183 A1 * | 1/2002 | Esselborn et al. | 106/400 |
| 2004/0077778 A1 | 4/2004 | Hazan et al. | |
| 2005/0032934 A1 | 2/2005 | Muenzenberger et al. | |

FOREIGN PATENT DOCUMENTS

| | | | |
|---|---|---|---|
| JP | 62149765 A | 7/1987 |
| JP | 8176465 A | 7/1996 |
| JP | 2002226783 A | 8/2002 |
| JP | 2002307011 A | 10/2002 |
| JP | 2004306367 A | 11/2004 |
| JP | 2005262841 A | 9/2005 |
| JP | 2005534788 A | 11/2005 |
| JP | 2005330339 A | 12/2005 |
| TW | 1225826 A | 7/1991 |
| WO | 0134713 A1 | 5/2001 |
| WO | 03048253 A1 | 6/2003 |
| WO | 2005063898 A1 | 7/2005 |

* cited by examiner

US 8,663,793 B2

EXCELLENT HEAT-DISSIPATING BLACK RESIN COMPOSITION, METHOD FOR TREATING A ZINC COATED STEEL SHEET USING THE SAME AND STEEL SHEET TREATED THEREBY

TECHNICAL FIELD

The present invention relates to a heat-dissipating black resin composition having excellent physical properties such as heat-dissipating property, workability and corrosion resistance, a method for treating a zinc coated steel sheet, and a steel sheet treated thereby, and more particularly, to a heat-dissipating black resin composition having excellent physical properties such as heat-dissipating property, workability, corrosion resistance, solvent resistance, coating adherence and gloss and being free from chromium and used for surface treatment of a zinc coated steel sheet, a method for treating a zinc coated steel sheet, and a zinc coated steel sheet treated thereby.

BACKGROUND ART

Recently, an internal temperature of the electronic equipment is increased as a heating value (HV) in electronics parts and circuits increases with production of small electronic equipment with high performance and high functionality, which leads to problems such as erroneous operation of semiconductor devices, undesirable changes in characteristics of resistor parts and shortened life span of their parts. Various techniques have been used as a heat radiation method for solving these problems. Heat sinks, fans and pipes have been used for the heat radiation, but the recent use of excellent heat-dissipating materials gives various significant advantages and effects.

From the abovementioned point of view, there have been attempts to endow a steel sheet with heat-absorbing and/or heat-dissipating properties. That is, there is an attempt to give heat-absorbing and/or heat-dissipating properties to a steel sheet by mixing a pigment such as carbon black and titania with polymeric resin to form a coating layer on the steel sheet, the pigment having excellent heat emissivity in an infrared wavelength range. When these methods apply to electronic equipment using a box-type steel sheet, it is possible to effectively radiate internal heat from the electronic equipment.

In the use of these methods, a pigment should be present in large quantity to give excellent heat-absorbing and/or heat-dissipating properties. As a result, the manufacturing cost is increased and the electrical resistance is high since a coating layer is thick in thickness. Electrostatic earth properties are required to prevent an electromagnetic wave from being generated in the electronic equipment, and therefore a steel sheet should have good surface electrical conductivity.

To manufacture a steel sheet having surface electrical conductivity and electromagnetic wave shielding property, a method has also been used in recent years, including: adding expensive metal powder such as Ni and Cu to a resin composition for surface-treating a steel sheet. However, this technique has disadvantages that the manufacturing cost is high and scratches are formed during the press finishing process. Also, there has been recently proposed a black resin coated steel sheet prepared by subjecting a surface of a Zn—Ni steel sheet to the black oxidation and coating the steel sheet with a resin composition, but this method has problems that it is difficult to manufacture a steel sheet whose surface is good and smooth and the steel sheet has its limit to give corrosion resistance and excellent surface conductivity.

SUMMARY OF THE INVENTION

The present invention has been made to solve the foregoing problems with the prior art, and therefore an object of the present invention is to provide a heat-dissipating black resin composition having excellent physical properties such as heat-dissipating property, workability, corrosion resistance, solvent resistance, coating adherence and gloss and being free from chromium and used for surface treatment of a zinc coated steel sheet.

Another object of the present invention is to provide a method for treating a steel sheet with the heat-dissipating black resin composition of the present invention.

Still another object of the present invention is to provide a resin-treated steel sheet treated by the method according to the present invention, wherein the steel sheet has excellent physical properties such as heat-dissipating property, workability, corrosion resistance, solvent resistance, coating adherence and gloss and is free from chromium.

According to an aspect of the present invention, there is provided a heat-dissipating black resin composition including 10 to 60 parts by weight of a resin composition which at least one main resin and a melamine-based curing agent are nixed in a weight ratio of 10:2-7, the main resin being selected from the group consisting of polyester resin, epoxy resin, polyolefin resin, polyurethane resin, fluorine resin, phenol resin, acryl resin and polycarbonate resin; 1 to 10 parts by weight of at least one pigment selected from the group consisting of carbon black and carbon nano tube; 1 to 10 parts by weight of a matting agent; and the balance of a solvent, based on 100 parts by weight of the heat-dissipating black resin composition.

According to another aspect of the present invention, there is provided a method for treating a steel sheet with a heat-dissipating black resin composition, the method including: coating a steel sheet with the heat-dissipating black resin composition according to the present invention so that a thickness of a dry coating film is in a range of 3 to 30 (micrometers); and drying the heat-dissipating black resin composition with which the steel sheet is coated.

According to still another aspect of the present invention, there is provided a steel sheet including a heat-dissipating black resin layer formed of a dry coating film coated with the heat-dissipating black resin composition according to the present invention and having a thickness of 3 to 30 (micrometers).

The zinc coated steel sheet coated with the heat-dissipating black resin composition according to the present invention includes a thin resin layer, shows excellent heat-absorbing/dissipating properties, has excellent physical properties such as corrosion resistance, press workability, surface electrical conductivity and solvent resistance, and is environmental-friendly since it is free from a chromium component, when compared to the conventional heat-dissipating black resin compositions.

DETAILED DESCRIPTION OF THE INVENTION

Figure 1:
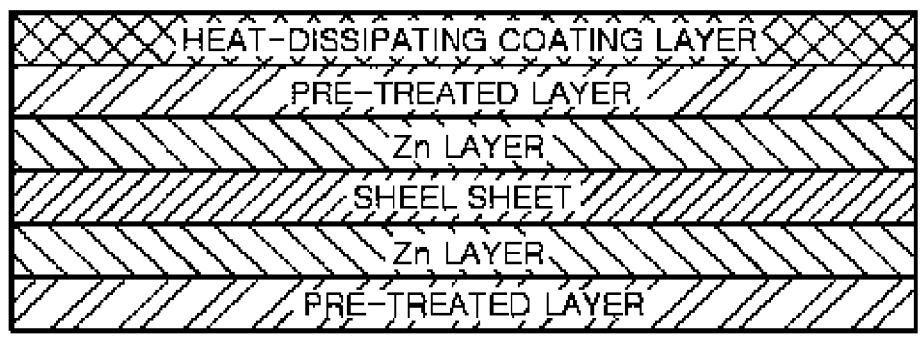
FIG. 1 is a side cross-sectional view illustrating a zinc coated steel sheet having a heat-dissipating black resin layer formed in one surface of a base steel sheet according to one exemplary embodiment of the present invention.

The heat-dissipating black resin composition according to the present invention is used for surface treatment to give excellent physical properties such as heat-dissipating property, workability, corrosion resistance, solvent resistance, coating adherence and gloss to a steel sheet, and does not contain chromium. Here, the heat-dissipating black resin composition is mixed, as follows. In particular, the above-mentioned physical properties derived from the heat-dissipating black resin composition of the present invention are improved when the resin composition is used together with the selected resin and melamine-based curing agent.

Examples of the main resin, which may be used in the heat-dissipating black resin composition according to the present invention, includes, but particularly limited to, polyester resin, epoxy resin, polyolefin resin, polyurethane resin, fluorine resin, phenol resin, acryl resin and polycarbonate resin. The main resins may be used alone or in combinations thereof.

It is preferable to use resins having a molecular weight of 2,000 to 20,000 as the main resin. When the molecular weight of the main resin is less than 2,000, the solvent resistance of a coating layer is not sufficiently achieved, whereas the solution stability of the resin composition is not adequate when the molecular weight of the main resin exceeds 20,000.

A melamine-based curing agent may be used as the curing agent, and examples of the curing agent include, but are not particularly limited to, melamine, butoxymethyl melamine, hexamethoxymethyl melamine and trimethoxymethyl melamine. The melamine-based curing agents may be used alone or in combination thereof.

The heat-dissipating black resin composition according to the present invention is a resin composition in which the main resin and the melamine-based curing agent is mixed in a weight ratio of 10:2-7, and preferably 10:3-5. Here, the main resin and the curing agent may be mixed with 10 to 60 parts by weight of the resin composition, based on 100 parts by weight of the heat-dissipating black resin composition. The mixing ratio of the main resin and the melamine-based curing agent is out of the range of 10:2-7, it is difficult to form a compact film, which leads to the deteriorated physical properties of the coating layer.

The corrosion resistance and workability are not sufficiently improved when the content of the resin composition prepared from the main resin and the melamine-based curing agent is less than 10 parts by weight, whereas the viscosity of the resin composition is increased due to the excessive content of the resin, the surface conductivity is deteriorated, and the physical properties of the coating layer are also degraded due to the high viscosity when the content of the resin composition exceeds 60 parts by weight.

As the pigment added to the heat-dissipating black resin composition according to the present invention, the carbon black and/or carbon nano tube may be mixed in a content of 1 to 10 parts by weight, and preferably 3 to 7 parts by weight, based on 100 parts by weight of the heat-dissipating black resin composition. When the pigment is added in a content of less than 1 part by weight, it is difficult to give sufficient heat-absorbing and/or heat-dissipating properties. On the contrary, when the content of the pigment exceeds 10 parts by weight, the viscosity of the solution becomes thick and the solvent resistance and coating adherence are deteriorated, which leads to the degraded physical properties of the resin composition.

As the pigment added to the heat-dissipating black resin composition according to the present invention, the carbon black and/or carbon nano tube includes, for example, Printex™ (Degussa, Germany), Highblack™ (Korea Carbon Black Co.), etc. The pigments may be use alone or in combinations thereof.

The pigment preferably has an average particle diameter of 10 to 30 nanometers. When the average particle diameter of the pigment is less than 10 nanometers, the resin composition is not easily dispersed, whereas the viscosity of the resin composition is excessively increased when the average particle diameter of the pigment exceeds 30 nanometers.

The matting agent added to the heat-dissipating black resin composition according to the present invention includes, but is not limited to, silica, magnesium oxide, zirconia, alumina and titania. The matting agents may be used alone or in combinations thereof.

The matting agent preferably has an average particle size of 10 micrometers or less. When the average particle size of the matting agent exceeds 10 micrometers, the physical properties of the coating layer may be deteriorated. Since the matting agents having an average particle size of 10 micrometers or less are suitable for the use in the resin composition of the present invention, any of the matting agents having a smaller average particle size than 10 micrometers may be used herein. However, there is no particular limitation on the lower limit in the average particle size of the matting agent.

The matting agent may be mixed in a content of 1 to 10 parts by weight, based on 100 parts by weight of the heat-dissipating black resin composition. When the content of the matting agent is less than 1 part by weight, it is impossible to give desirable gloss to the home electronic equipment, whereas a steel sheet does hardly have an aesthetic effect due to the low gloss when the content of the matting agent exceeds 10 parts by weight.

In order to improve physical properties of a steel sheet treated with the heat-dissipating black resin composition as well as the main resin, the melamine-based curing agent, the pigment and the matting agent, the heat-dissipating black resin composition according to the present invention may include at least one selected from the group consisting of a crosslinking promoter, wax, a curing catalyst, a pigment anti-agglomerant, an antifoaming agent, a phosphate-based additive, a silane compound, etc., if necessary.

The crosslinking promoter may be optionally added to facilitate the curing of the heat-dissipating black resin composition and maintain and improve corrosion resistance of a coating layer. Here, the crosslinking promoter includes, but is not particularly limited to, titanium compound and/or zirconium compound.

Examples of the titanium compound include, but are not particularly limited to, isopropyl ditriethanolamino titanate, titanium lactate chelate and titanium acetylacetonate. Examples of the zirconium compound include, but are not particularly limited to, zirconium lactate, zirconium acetylacetonate and zirconium triethanolaminate. As the crosslinking promoter, the titanium compound and/or zirconium compound may be used alone or in combination thereof.

The crosslinking promoter may be used in a content of up to 5 parts by weight, and preferably a content of 0.5 to 5 parts by weight, based on 100 parts by weight of the heat-dissipating black resin composition of the present invention. When the content of the crosslinking promoter exceeds than 5 parts by weight, it is difficult to further improve physical properties of the resin composition according to the increased amount of the used curing promoter, and the manufacturing cost is increased. There is no particular limitation on the lower limit in the mixing amount of the crosslinking promoter since the crosslinking promoter is an optionally added component, but the crosslinking promoter is preferably mixed in a content of 0.5 parts by weight or more, based on 100 parts by weight of the heat-dissipating black resin composition, so as to facilitate the sufficient curing of the heat-dissipating black resin composition and ensure high corrosion resistance of a coating layer.

Also, a lubricating wax may be added to endow the heat-dissipating black resin composition of the present invention with self-lubricating characteristics. The wax includes, but is not particularly limited to, polyolefin wax, ester wax and polyethylene wax. The waxes may be used alone or in combination thereof.

Waxes having a particle size of 0.1 to 2.0 micrometers are preferably used as the lubricating wax. When the particle size of the wax is less than 0.1 micrometers, it is undesirable due to the lack of the lubricating characteristics, whereas the solution stability of the resin composition is degraded when the particle size of the wax exceeds 2.0 micrometers.

The wax may be mixed in a content of 5 parts by weight or less, based on 100 parts by weight of the heat-dissipating black resin composition. When the content of the wax exceeds 5 parts by weight, there is no further improvement in the lubricating effect according to the increasing content of the wax, but the desired physical properties such as corrosion resistance and storage stability of the resin composition are rather deteriorated. There is no particular limitation on the lower limit in the mixing amount of the wax since the wax is an optionally added component, but the wax is preferably mixed in a content of 0.1 parts by weight or more, based on 100 parts by weight of the heat-dissipating black resin composition, so as to ensure the sufficient lubricating characteristics of a coating layer according to the addition of the wax and improve its processability and formability.

Also, a curing catalyst may be added to the heat-dissipating black resin composition according to the present invention. The catalyst includes, but is not particularly limited to, dodecylbenzenesulfonic acid and para-toluene sulfonic acid. The catalysts may be used alone or in combination thereof. The catalyst may be mixed in a content of up to 5 parts by weight, based on 100 parts by weight of the heat-dissipating black resin composition. When the content of the catalyst exceeds 5 parts by weight, the solution stability of the resin composition may be deteriorated. There is no particular limitation on the lower limit in the mixing amount of the curing catalyst since the curing catalyst is an optionally added component, but the curing catalyst is preferably mixed in a content of 0.1 parts by weight or more, based on 100 parts by weight of the heat-dissipating black resin composition, so as to show the sufficient catalytic performances in the curing reaction according to the addition of the curing catalyst, and thus completely coat a steel sheet with a coating film of the resin composition.

Also, a dispersing agent for preventing agglomeration of pigment may be added to the heat-dissipating black resin composition of the present invention, when necessary. The dispersing agent includes, but is not particularly limited to, a product name BYK-170 (BYK Chemie).

The dispersing agent for preventing agglomeration of pigment may be mixed in a content of up to 2 parts by weight, based on 100 parts by weight of the heat-dissipating black resin composition. When the content of dispersing agent for preventing agglomeration of pigment exceeds 2 parts by weight, a coating layer of the resin composition formed on a steel sheet may be degraded in physical properties. There is no particular limitation on the lower limit in the mixing amount of the dispersing agent for preventing agglomeration of pigment since the dispersing agent for preventing agglomeration of pigment is an optionally added component, but the dispersing agent for preventing agglomeration of pigment is preferably mixed in a content of 0.1 parts by weight or more, based on 100 parts by weight of the heat-dissipating black resin composition, so as to secure a sufficient effect on the dispersion of pigment according to the addition of the dispersing agent.

An antifoaming agent may be optionally added to the heat-dissipating black resin composition for the purpose of removal of bubbles. The antifoaming agent includes N-methylethanolamine, N-ethylethanolamine and N-methylpropanolamine, and they may be used alone or in combinations thereof.

The antifoaming agent may be mixed in a content of up to 2 parts by weight, based on 100 parts by weight of the heat-dissipating black resin composition. When the content of the antifoaming agent exceeds 2 parts by weight, the coating quality in a surface of the coated steel sheet may be deteriorated. There is no particular limitation on the lower limit in the nixing amount of the antifoaming agent since the antifoaming agent is an optionally added component, but the antifoaming agent is preferably mixed in a content of 0.1 parts by weight or more, based on 100 parts by weight of the heat-dissipating black resin composition, so as to show a sufficient effect on the removal of bubbles according to the addition of the antifoaming agent.

A phosphate-based additive may be optionally added to control their increased alkalinity, which is increased when ceramic powders such as silica, alumina and the like are used in the heat-dissipating black resin composition, and to improve their solvent resistance and storage stability.

The phosphate-based additive includes, but is not particularly limited to, zinc phosphate, magnesium phosphate, etc., and they may be used alone or in combinations thereof.

The phosphate-based additive may be mixed in a content of up to 2 parts by weight, based on 100 parts by weight of the heat-dissipating black resin composition. When the content of the phosphate-based additive exceeds 2 parts by weight, the agglomeration of the heat-dissipating black resin composition may be caused due to the very strong acidity, which leads to the damage to the stable storage. There is no particular limitation on the lower limit in the mixing amount of the phosphate-based additive since the phosphate-based additive is an optionally added component, but the phosphate-based additive is preferably mixed in a content of 0.1 parts by weight or more, based on 100 parts by weight of the heat-dissipating black resin composition, so as to show a sufficient effect on the reduction of alkalinity.

Also, a silane compound may be added to the heat-dissipating black resin composition of the present invention, when necessary. The silane compound functions to strengthen a coating layer and improve its gloss. For example, the silane compound includes, but is not particularly limited to, 3-aminopropyltriethoxy silane, 3-glycidoxypropyltrimethoxy silane, 3-methaglyoxypropyltrimethoxy silane, 3-mercaptopropyltrimethoxy silane, N-(beta-aminoethyl)-gamma-aminopropyltrimethoxysilane, gamma-glycidoxypropyltriethoxy silane and gamma-glycidoxytrimethyldimethoxysilane. The silane compounds may be used alone or in combinations thereof.

The silane compound may be mixed in content of up to 2 parts by weight, based on 100 parts by weight of the heat-dissipating black resin composition. When the content of the silane compound exceeds 2 parts by weight, the un-reacted silane compound is present in the coating layer, and therefore the physical properties of a coating layer may be deteriorated and the agglomeration of resin may be caused, which leads to the damage to the storage stability of the resin composition. There is no particular limitation on the lower limit in the mixing amount of the silane compound since the silane compound is an optionally added component, but the silane compound is preferably mixed in a content of 0.1 parts by weight or more, based on 100 parts by weight of the heat-dissipating black resin composition, so as to show a sufficient gloss and form a strong coating layer according to the addition of the silane compound.

The balance is a solvent in the heat-dissipating black resin composition according to the present invention, and the solvent includes toluene, solvent naphtha, cellosolve, cellosolve acetate, butyl cellosolve, etc. The solvents may be used alone or in combinations thereof.

The viscosity of the heat-dissipating black resin composition is controlled according to the content of the solvent, and there is no particular limitation on the content of the solvent, but the solvent may be adjusted to a suitable content range, depending on the methods known to those skilled in the art. The present invention is not particularly limited to the content of the solvent, but content of the solvent is preferably adjusted to a content range where the resin composition has a suitable viscosity to take 20 to 200 seconds to discharge the resin composition into a Ford cup #4.

Hereinafter, the method for treating a steel sheet using the heat-dissipating black resin composition according to the present invention will be described in detail, as follows.

First, a steel sheet is coated with the heat-dissipating black resin composition according to the present invention so that a dry coating film can have a thickness of 3 to 30 micrometers, and preferably 5 to 20 micrometers. When the steel sheet is coated with the heat-dissipating black resin composition so that the dry coating film can have a thickness of less than 3 micrometers, the solvent resistance and heat-dissipating property of the coating layer are poor, but the manufacturing cost may be increased when the thickness of the dry coating film exceeds 30 micrometers.

As the steel sheet, a zinc coated steel sheet, especially a galvanizing steel (GI), a galvannealed steel (GA) and an electrogalvanized steel may be used herein. A rust-proof steel sheet may also be treated with the heat-dissipating black resin composition according to the present invention.

The heat-dissipating black resin composition according to the present invention may be applied to one or both sides of a steel sheet. The present invention is not particularly limited to the abovementioned application, but the application may be carried out in any of the conventional methods. For example, a bar-coater or roll-coater method may be used as the abovementioned application.

A steel sheet is treated with the heat-dissipating black resin composition by coating the steel sheet with the heat-dissipating black resin composition, followed by drying the coated heat-dissipating black resin composition. The present invention is not particularly limited to the abovementioned drying operation, but the drying operation may be carried out using a hot air heating system or an induction heating system.

For the hot air heating system, the resin composition may be dried at an ambient temperature of 160 to 340 degrees Celcius(C) for 10 to 5) seconds. When the ambient temperature is less than 160 degrees C., the curing time of the resin composition is too long. On the contrary, when the ambient temperature exceeds 340 degrees C., the performances of an oven do not get over the temperature. Also, the coated composition is sufficiently dried when it is dried in the temperature range for 10 to 50 seconds. When the drying time is less than 10 second, the composition is not sufficiently dried, whereas the drying operation is uneconomical when the drying time exceeds 5) seconds.

For the induction heating system, the resin composition may be dried in a frequency range of 5 to 5) MHz at a power of 3 to 15 kW for 1 to 10 second. When the frequency range, the power and the drying time are out of the range of 5 to 5) MHz, 3 to 15 kW and 1 to 10 seconds, respectively, the coated composition is not sufficiently dried, the curing time is extended, or the drying operation is not economical. Therefore, it is desirable to dry the resin composition under the condition ranges such as the frequency range, the power and the drying time.

After coating the steel sheet with the heat-dissipating composition, the heat-dissipating composition may be cured at a low temperature. Here, the drying temperature is referred to as a peak metal temperature (PMT), and the composition is preferably dried at a temperature of 150 to 280 degrees C. The drying at the temperature of less than 150 degrees C. takes a long time to dry the resin composition sufficiently, whereas the additional increase in temperature is uneconomical since it is possible to dry the resin composition at about 280 degrees C. sufficiently.

The steel sheet treated with the heat-dissipating black resin composition according to the present invention according to the method of the present invention is formed of a heat-dissipating black resin coating layer whose thin film is formed in one or both sides thereof, and more particularly a coating film coated with the heat-dissipating black resin composition according to the present invention and having a thickness of 3 to 30 micrometers, and preferably a thickness of 5 to 20 micrometers when the composition is dried. Here, the coating film does not containing chromium, and has excellent physical properties such as heat-dissipating property, workability, particularly press workability, corrosion resistance, solvent resistance, coating adherence and gloss.

Figure 2:
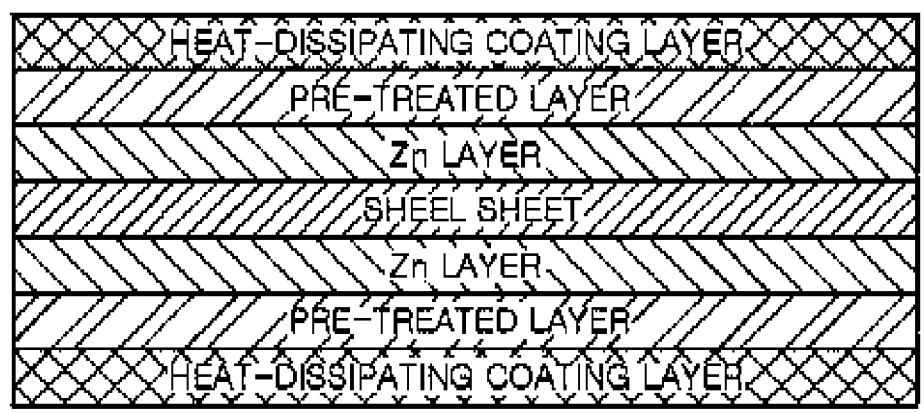
FIG. 2 is a side cross-sectional view illustrating a zinc coated steel sheet having heat-dissipating black resin layers formed in both surfaces of a base steel sheet according to another exemplary embodiment of the present invention.

FIGS. 1 and 2 are side cross-sectional views illustrating a heat-dissipating black resin steel sheet according to the present invention. The steel sheet according to the present invention may be prepared by forming a zinc-coated layer in both side of a steel sheet and forming a resin layer, which is formed of the heat-dissipating black resin composition according to the present invention, on both sides of the zinc-coated layer as shown in FIG. 1, but the present invention is not particularly limited thereto. Also, the steel sheet according to the present invention may also be prepared by forming heat-dissipating black resin layers, which are formed of the heat-dissipating black resin composition according to the present invention, on both sides of a zinc coated steel sheet, as shown in FIG. 2.

Also, the steel sheet having a coating film according to the present invention formed therein shows excellent heat-absorbing and/or heat-dissipating properties, and particularly superior heat-absorbing and/or heat-dissipating properties as the coating film gets blackish. The steel sheet of the present invention may be used as a zinc coated steel sheet for high-class home electronic appliances having beautiful appearances.

Hereinafter, exemplary embodiments of the present invention will be described in detail with reference to the accompanying drawings. However, it is considered that the description proposed herein is just a preferable example for the purpose of illustrations only, not intended to limit the scope of the invention.

EXAMPLES

1. Zinc Coated Steel Sheet Used in this Example

An electrogalvanized steel (EG, a steel sheet thickness: 0.8 mm) whose both sides are coated with zinc at a one-side coating amount of 20 g/m was used herein.

2. Preparation of Heat-Dissipating Black Resin Composition and Test Samples

A main resin and a melamine-based curing agent were mixed at a weight ratio of 10:4 to prepare a resin composition. Each of the resulting resin composition, a carbon black, a matting agent and titanate was mixed in a content range, based on 100 parts by weight of the heat-dissipating composition, as listed in the following Table 1. As the other additives, 1 part by weight of a polyethylene wax; 2 parts by weight of P-toluene sulfonic acid as a curing catalyst; 0.5 parts by weight of a BYK-170™ pigment antiagglomerant (BYK chemie); 0.5 parts by weight of an N-methylethanolamine antifoaming agent; 0.5 parts by weight of zinc phosphate as a phosphate-based additive; and 1 part by weight of gamma-glycidoxypropyltriethoxysilane as a silane compound were added, based on 100 parts by weight of the heat-dissipating black resin composition, and zirconia balls were added to the resulting resin composition, and the resin composition was stirred at a rotary speed of 3000 rpm for 30 minutes in a high speed agitator to prepare a heat-dissipating black resin composition. A polyester resin was used as the main resin. A mixture of silica and titania (at a weight ratio of 9:1) was used as the matting agent, and the silica and titania having an average particle size of 3 to 10 micrometers were used as the matting agent. Trimethoxymethyl melamine was used as the melamine-based curing agent. The used polyethylene wax had an average particle size of about 0.5 to 1.5 micrometers, and carbon black used as the pigment had an average particle diameter of about 15 to 25 nanometers. Meanwhile, the heat-dissipating black resin composition was mixed so that the content of the solvent can be adjusted to a content range where the resin composition has a suitable viscosity to take about 30 to 60 seconds to discharge the resin composition into a Ford cup #4 (DIN 53211) using a thinner (cellosolve acetate) as the solvent.

Then, the prepared heat-dissipating black resin composition of Inventive examples and Comparative examples were bar-coated onto one side of each of the steel sheets to form dry coating films having a thickness of 8 micrometers, and then dried at a PMT of 200 degrees C. to prepare test samples of heat-dissipating steel sheets treated with the resin composition.

The contents and components of the resin compositions of Inventive examples were listed in the following Table 1. The contents of the resin compositions in the following Table 1 were represented on the basis of 100 parts by weight of the heat-dissipating black resin composition. The balance except for the additives was a thinner as the solvent.

As the steel sheet used in the present invention, an electrogalvanized steel sheet (steel sheet thickness 0.8 millimeters; one-side coating amount: 20 g/m$^2$; a coating layer including a polyester resin and a silica matting agent; and a resin coating layer having a thickness of 23 micrometers) commercially available from the company A was used in Comparative example 1, a steel sheet (steel sheet thickness: 0.8 millimeter; one-side zinc coating amount: 20 g/m$^2$; a coating layer including a polyester resin, a silica matting agent and a Ni metal powder; and a coating layer having a thickness of 9 micrometers) commercially available from the company B was used in Comparative example 2, an anti-fingerprintable steel sheet (steel sheet thickness: 0.8 millimeters, resin coating amount: 1000 mg/m$^2$) commercially available from the company C was used in Comparative example 3, a molten zinc coated steel sheet (including Al (percentage by weight); a galvalume steel sheet; steel sheet thickness: 0.8 millimeters; and one-side coating amount: 60 g/m$^2$) commercially available from the company D and used for PDP TV panels was used in Comparative example 4, and an aluminum steel sheet (a steel sheet thickness: 0.8 millimeters) commercially available from the company D was used in the case of Comparative example 5.

Table 1

TABLE 1

|  |  | Resin Composition (Main resin + Curing agent) | Carbon Black | Matting agent | Titanate | Curing System |
|---|---|---|---|---|---|---|
| Inventive examples | 1 | 18 | 2 | 2.7 | 2.5 | Induction heating |
|  | 2 | 18 | 6 | 2.7 | 0.5 |  |
|  | 3 | 28 | 6 | 6.7 | 0.5 |  |
|  | 4 | 22 | 6 | 6.7 | 0.5 |  |
|  | 5 | 22 | 2 | 6.7 | 2.5 |  |
|  | 6 | 32 | 6 | 2.7 | 0.5 |  |
|  | 7 | 32 | 2 | 6.7 | 0.5 |  |
|  | 8 | 28 | 2 | 6.7 | 2.5 |  |
|  | 9 | 28 | 6 | 2.7 | 2.5 |  |
|  | 10 | 22 | 2 | 2.7 | 0.5 |  |
|  | 11 | 32 | 2 | 2.7 | 2.5 |  |
|  | 12 | 28 | 2 | 2.7 | 0.5 |  |
|  | 13 | 18 | 2 | 6.7 | 0.5 |  |
|  | 14 | 18 | 6 | 6.7 | 2.5 |  |
|  | 15 | 22 | 6 | 2.7 | 2.5 |  |
|  | 16 | 25 | 4 | 4.7 | 1.5 |  |
|  | 17 | 32 | 6 | 6.7 | 2.5 |  |

3. Evaluation of Physical Properties

Performances of the steel sheets of Inventive examples and Comparative examples were evaluated under the following conditions, and the results were listed in the following Table 2.

1) Heat-Absorbing and Heat-Dissipating Properties

Figure 3:
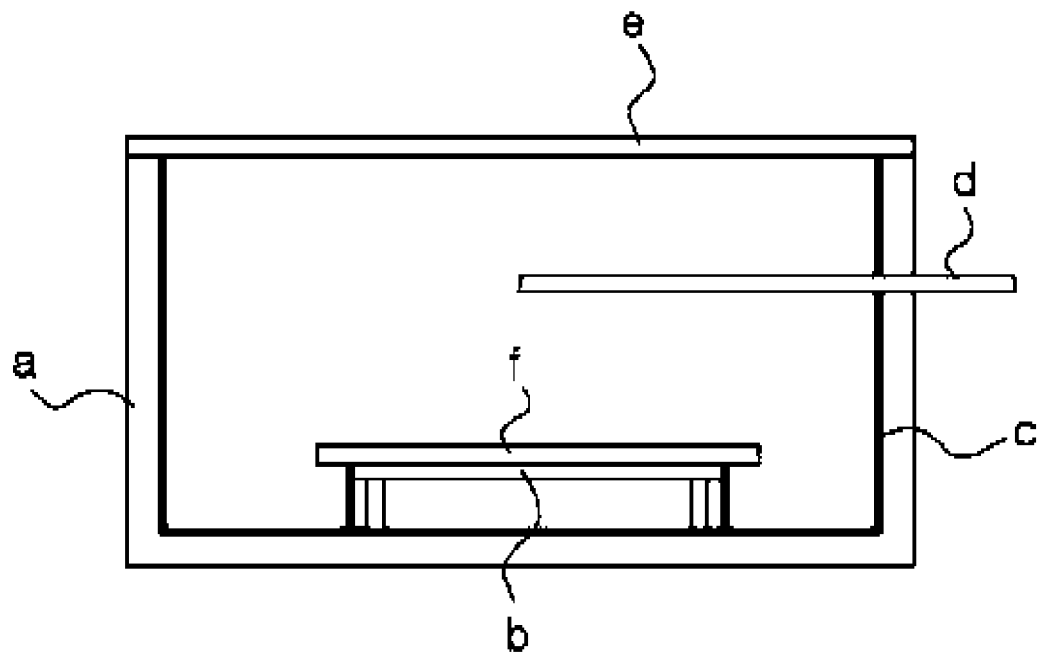
FIG. 3 is a diagram illustrating a tester for measurement of heat-absorbing/dissipating properties used in embodiments of the present invention.

A test device as shown in FIG. 3 was manufactured to evaluate the heat-absorbing and heat-dissipating properties of the steel sheets of Inventive examples and Comparative examples. The exterior of the test device as shown in FIG. 3 was made of styrofoam (a), an aluminum foil (c) was lined in an inside wall of the styrofoam, and a heater (b) is mounted on a central bottom region of the test device. An aluminum plate (f) for prevention of radiation was mounted on the heater (b). A temperature test equipment (d) was installed a central region between the heater (b) and the top of the test device (e) so that it can be disposed in the center of the heater (b), as shown in FIG. 3. The test samples to be measured were placed on the open top of the test device, and the changes in internal temperature of the box. The size of the test device was 200× 200×200 millimeters.

The prepared black resin coated steel sheet samples were cut into pieces (200 millimeters long and 200 millimeters wide), and attached and sealed to the open top of the test device. The heat-dissipating temperature was evaluated by calculating the difference (delta ($\Delta$) T) in the internal temperature of the coated steel sheet from the un-coated EG steel sheet.

Figure 4:
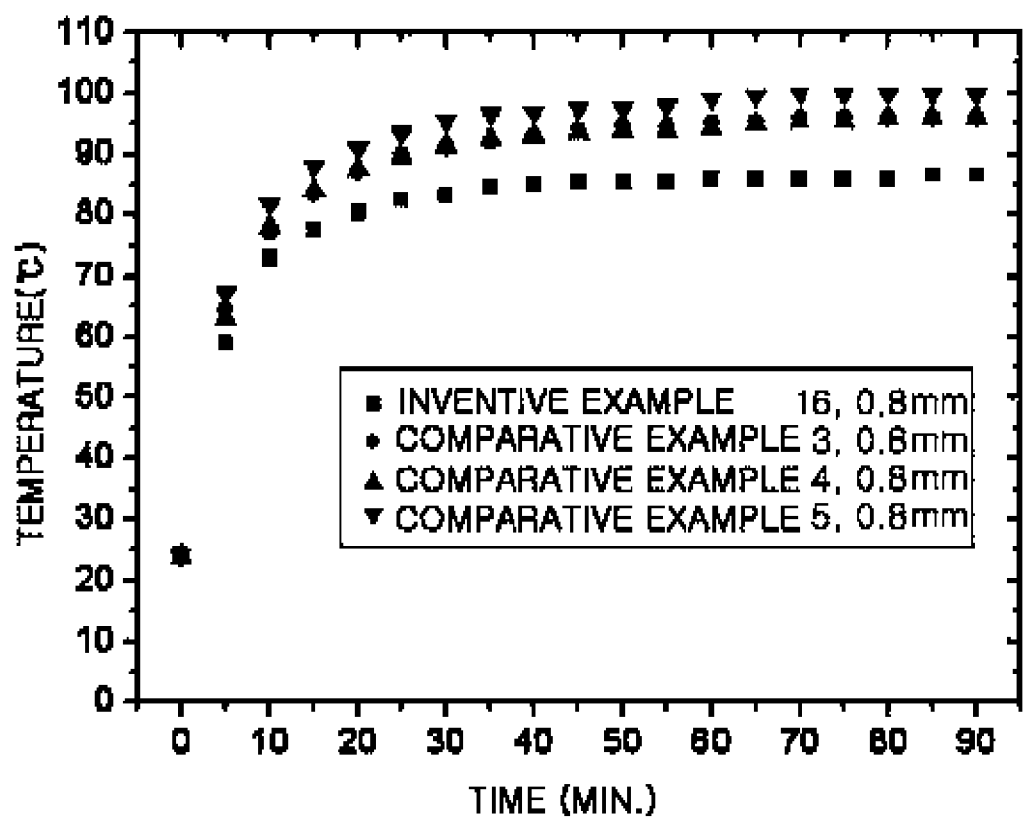
FIG. 4 is a graph illustrating the results obtained by measuring heat-dissipating temperature of the steel sheets of Inventive example 16 and Comparative examples 3 to 5.

Also, the steel sheets of Inventive example 16 and Comparative examples 3 to 5 were measured for heat-dissipating temperature, and plotted in a graph as shown in FIG. 4. As shown in Table 2, it was revealed that the steel sheet of Inventive example 16 shows excellent heat-dissipating properties, compared to the steel sheets of Comparative examples 3 to 5.

2) Workability 100 lines were drawn in a chequered shape at a distance of 1 millimeter on a surface of the black resin coated steel sheet, and the adhesion of the coating layer was evaluated by counting the coating layers that were peeled off while being attached to a 6 millimeters Scotch tape when the coating layers were peeled off with the Scotch tape after the Ericsen process.

[Evaluation Criteria]

Excellent: No peeling, Good: peeling rate of less than 5%, and Poor; peeling rate of 5% or more.

3) Corrosion Resistance

Saline was sprayed on a steel sheet according to the ASTM B117 standard, and the black resin coated black steel sheet was then measured for corrosion resistance. The grades of the corrosion resistance were determined as the function of time until 5% white rust is formed in the steel sheet. The black resin coated steel sheet was evaluated, as follows.

[Evaluation Criteria]

Excellent: less than 5% area with white rust after 120 hours,

Good: less than 5% area with white rust after 72 to 120 hours,

Slight: less than 5% area with white rust after 48 to 72 hours, and

Poor: at least 5% area with white rust after 48 hours.

The corrosion resistance of a finished part was evaluated by undergoing the saline spray test on X-cut points of the test sample, and determining a width of an area in which blisters are formed.

[Evaluation Criteria]

Excellent: less than 2 millimeters, Good: 3 to 5 millimeters, Poor: 5 millimeters or more.

4) Coating Adherence

A heat-dissipating black resin coated steel sheet sample was put into distilled water at 5) degrees C., immersed at 240 hours, and then dried according to the ASTM D3359 standard. 100 lines were drawn in a chequered shape at a distance of 1 millimeters on a coating surface of the prepared steel sheet sample, and the adhesion of the coating layer was evaluated by counting the coating layers that were peeled off while being attached to a Scotch tape when the coating layers were peeled off with the Scotch tape.

[Evaluation Criteria]

Excellent: Null of peeled coating layers,

Good: 1 to 3 peeled coating layers,

Poor: at least 4 peeled coating layers.

5) Solvent Resistance

A black resin coated steel sheet sample was cut into pieces (50 millimeters long and 100 millimeters wide), and the solvent resistance was determined by counting the rubbing number (at a force of about 1 kgf) until a coating layer is peeled off by rubbing the black resin coated steel sheet sample with a gauze wet with methyl ethyl ketone or acetone.

[Evaluation Criteria]

Excellent: 20 times or more, Good: 10 to 20 times,

Slight: 5 to 10 times, and Poor: 5 times or less

6) Electrical Conductivity

Surface electrical conductivity was measured according to a LORESTA GP four-probe method (Mitsubishi Chemical Co.), and an 80 millimeters×150 millimeters test sample was measured 9 times to evaluate the electrical conductivity as an average value.

[Evaluation Criteria]

Excellent: 10 Mohm (M$\Omega$) or less, Good: 10 to 100 Mohm (M$\Omega$), and Poor: 1000 Mohm (M$\Omega$) or more 7) Anti-Fingerprintability Anti-fingerprintability was evaluated by immersing a coated steel sheet in an artificial fingerprint solution for 5 second, and measuring the changes in color difference (delta ($\Delta$) E).

[Evaluation Criteria]

Excellent: delta ($\Delta$) E$\leq$0.5, Good: 0.5E$\leq$delta ($\Delta$) E$\leq$2.0 and Poor: delta ($\Delta$) E$\geq$2.0

8) Solution Stability

The heat-dissipating black resin composition of the present invention was kept at 60 degrees C. for 2 weeks in an incubator, and the increase in viscosity, gelation and precipitation of the composition were observed. Then, the solution stability of a test sample was evaluated according to the following standards.

[Evaluation Criteria]

Excellent: No change in increased viscosity, galation and precipitation of the composition, Good: 5% or less increased viscosity of the composition observed only, Poor: 5% or more increased viscosity, gelation and precipitation of the composition all observed.

Table 2

TABLE 2

| | No. | Flat sheet corrosion resistance | Finished part corrosion resistance | Workability | Coating adherence | Solution stability | electrical conductivity | Solvent resistance | Anti-fingerprintability | heat-dissipating property ($\Delta$T, ° C.) |
|---|---|---|---|---|---|---|---|---|---|---|
| Inventive examples | 1 | Excellent | Excellent | Excellent | Excellent | Excellent | Good | Good | Excellent | 5 |
| | 2 | Excellent | Excellent | Excellent | Excellent | Excellent | Good | Good | Excellent | 8 |
| | 3 | Excellent | Excellent | Excellent | Excellent | Excellent | Good | Good | Excellent | 10 |
| | 4 | Excellent | Excellent | Excellent | Excellent | Excellent | Good | Excellent | Excellent | 10 |
| | 5 | Excellent | Excellent | Excellent | Excellent | Excellent | Good | Excellent | Excellent | 7 |
| | 6 | Excellent | Excellent | Excellent | Excellent | Excellent | Good | Excellent | Excellent | 8 |
| | 7 | Excellent | Excellent | Excellent | Excellent | Excellent | Good | Excellent | Excellent | 6 |
| | 8 | Excellent | Excellent | Excellent | Excellent | Excellent | Good | Good | Excellent | 6 |
| | 9 | Excellent | Excellent | Excellent | Excellent | Excellent | Good | Good | Excellent | 8 |
| | 10 | Excellent | Excellent | Excellent | Excellent | Excellent | Good | Excellent | Excellent | 5 |

TABLE 2-continued

|  | No. | Flat sheet corrosion resistance | Finished part corrosion resistance | Work- ability | Coating adherence | Solution stability | electrical conductivity | Solvent resistance | Anti-finger- printability | heat-dissipating property (ΔT, ° C.) |
|---|---|---|---|---|---|---|---|---|---|---|
|  | 11 | Excellent | Excellent | Excellent | Excellent | Excellent | Good | Excellent | Excellent | 5 |
|  | 12 | Excellent | Excellent | Excellent | Excellent | Excellent | Good | Excellent | Excellent | 5 |
|  | 13 | Excellent | Excellent | Excellent | Excellent | Excellent | Good | Good | Excellent | 6 |
|  | 14 | Excellent | Excellent | Excellent | Excellent | Excellent | Good | Good | Excellent | 10 |
|  | 15 | Excellent | Excellent | Excellent | Excellent | Excellent | Good | Excellent | Excellent | 8 |
|  | 16 | Excellent | Excellent | Excellent | Excellent | Excellent | Good | Excellent | Excellent | 10 |
|  | 17 | Excellent | Excellent | Excellent | Excellent | Excellent | Good | Excellent | Excellent | 10 |
| Comp. examples | 1 | Excellent | Excellent | Excellent | Excellent | — | Poor | Excellent | Excellent | 6 |
|  | 2 | Excellent | Excellent | Poor | Poor | — | Excellent | Poor | Excellent | 6 |
|  | 3 | Good | Good | Poor | Excellent | — | Excellent | Poor | Good | 2 |
|  | 4 | Good | Poor | Excellent | — | — | Excellent | — | — | 2 |
|  | 5 | Excellent | Excellent | Excellent | — | — | Excellent | — | — | −2 |

It was revealed that, although the steel sheet treated according to the method of the present invention is able to be manufactured in the low-temperature curing process and has a thin coating layer, it shows excellent heat-dissipating properties when compared to the steel sheets of Comparative examples. Also, it was revealed that, when the steel sheet is treated according to the method of the present invention, the coating layer of the steel sheet shows excellent physical properties even in a fast-heating process using the induction heating.

The steel sheet of Comparative example 1 was a thick black resin steel sheet, and had excellent coating properties but poor surface electrical conductivity. In the case of Comparative example 2, a coating film of the steel sheet had scratches formed therein and poor solvent resistance in the press finishing process due to the presence of the introduced metal particles. The steel sheet of Comparative example 3 was a steel sheet prepared by coating an electrogalvanized steel sheet with 1 to 2 g/m$^2$ of an anti-fingerprintable resin composition, and showed an effect of reducing a temperature of 2 degrees C. when compared to the un-coated EG steel sheet. The steel sheet of Comparative example 4 was a galvalume steel sheet used for PDP TV parts, and had heat-dissipating properties similar to those of the anti-fingerprintable steel sheet but poor corrosion resistance. The steel sheet of Comparative example 5 was an aluminum steel sheet used for PDP TV parts, and, due to the heat-reflecting property in a surface of the steel sheet, showed heat-dissipating properties at −4 degrees C. (heat-dissipating properties at −2 degrees C. when compared to the EG steel sheet) when compared to the anti-fingerprintable steel sheet. On the contrary, the steel sheets of Inventive examples 3, 4, 14, 16 and 17 showed an excellent effect of decreasing an internal temperature of 10 degrees C. Also, the steel sheets showed excellent heat-dissipating properties at 12 degrees C., compared to the aluminum steel sheets used for the PDP.

The invention claimed is:

1. A heat-dissipating black resin composition, comprising, based on 100 parts by weight of the heat-dissipating black resin composition:

10 to 60 parts by weight of a resin composition in which at least one main resin and a melamine-based curing agent are mixed in a weight ratio of 10:2-7, the main resin being selected from the group consisting of polyester resin, epoxy resin, polyolefin resin, polyurethane resin, fluorine resin, phenol resin, acryl resin and polycarbonate resin;

1 to 10 parts by weight of at least one pigment selected from the group consisting of carbon black and carbon nano tube;

1 to 10 parts by weight of a matting agent including silica and titania at a weight ratio of 9:1;

0.1 to 2 parts by weight of at least one selected from the group consisting of 3-aminopropyltriethoxy silane, 3-glycidoxypropyltrimethoxy silane, 3-methaglyoxypropyltrimethoxy silane, 3-mercaptopropyltrimethoxy silane, N-(beta-aminoethyl)-gamma-aminopropyltrimethoxysilane, gamma-glycidoxypropyltriethoxysilane and gamma-glycidoxytrimethyldimethoxysilane;

0.1 to 2 parts by weight of a phosphate-based additive; and a solvent.

2. The heat-dissipating black resin composition of claim 1, wherein the main resin has a molecular weight of 2,000 to 20,000.

3. The heat-dissipating black resin composition of claim 1, wherein the melamine-based curing agent is at least one selected from the group consisting of melamine, butoxymethyl melamine, hexamethoxymethyl melamine and trimethoxymethyl melamine.

4. The heat-dissipating black resin composition of claim 1, wherein the mixing ratio of the main resin and the melamine-based curing agent is in a range of 10:3-5.

5. The heat-dissipating black resin composition of claim 1, wherein the pigment has an average particle size of 10 to 30 nanometers.

6. The heat-dissipating black resin composition of claim 1, wherein the matting agent has an average particle size of 10 micrometers or less.

7. The heat-dissipating black resin composition of claim 1, further comprising at least one selected from the group consisting of a crosslinking promoter, wax, a curing catalyst, a pigment antiagglomerant, and an antifoaming agent.

8. The heat-dissipating black resin composition of claim 7, wherein the crosslinking promoter is a zirconium compound and/or a titanium compound.

9. The heat-dissipating black resin composition of claim 8, wherein the titanium compound is at least one selected from the group consisting of isopropyl ditriethanolamino titanate, titanium lactate chelate and titanium acetylacetonate.

10. The heat-dissipating black resin composition of claim 8, wherein the zirconium compound is at least one selected from the group consisting of zirconium lactate, zirconium acetylacetonate and zirconium triethanolaminate.

11. The heat-dissipating black resin composition of claim 7, wherein the wax is at least one selected from the group consisting of polyolefin wax, ester wax and polyethylene wax.

12. The heat-dissipating black resin composition of claim 7, wherein the curing catalyst is dodecylbenzenesulfonic acid, para-toluene sulfonic acid or their mixture.

13. The heat-dissipating black resin composition of claim 7, wherein the antifoaming agent is N-methylethanolamine.

14. The heat-dissipating black resin composition of claim 7, wherein the phosphate-based additive is at least one selected from the group consisting of zinc phosphate and magnesium phosphate.

15. A steel sheet comprising a base steel sheet; and a heat-dissipating black resin layer formed of a dry coating film and having a thickness of 3 to 30 micrometers, the dry coating film being prepared by coating one or both surfaces of the base steel sheet with the heat-dissipating black resin composition as defined in claim 1.

16. The steel sheet of claim 15, wherein the base steel sheet is selected from the group consisting of a galvanizing steel (GI steel), a galvannealed steel (GA steel), an electrogalvanized steel (EG steel) and a rust-proof steel.

* * * * *

UNITED STATES PATENT AND TRADEMARK OFFICE
CERTIFICATE OF CORRECTION

PATENT NO. : 8,663,793 B2  Page 1 of 1
APPLICATION NO. : 12/521001
DATED : March 4, 2014
INVENTOR(S) : Jo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this
Twenty-ninth Day of September, 2015

Michelle K. Lee
*Director of the United States Patent and Trademark Office*